(12) United States Patent
Piercefield

(10) Patent No.: US 11,891,020 B1
(45) Date of Patent: Feb. 6, 2024

(54) MULTIFUNCTIONAL UTILITY RACK ATTACHMENT

(71) Applicant: James Logan Piercefield, Clam Gulch, AK (US)

(72) Inventor: James Logan Piercefield, Clam Gulch, AK (US)

( * ) Notice: Subject to any disclaimer, the term of this patent is extended or adjusted under 35 U.S.C. 154(b) by 0 days.

(21) Appl. No.: 18/478,838

(22) Filed: Sep. 29, 2023

(51) Int. Cl.
| | |
|---|---|
| *B60R 9/06* | (2006.01) |
| *B60R 11/02* | (2006.01) |
| *B60R 9/08* | (2006.01) |
| *B60R 11/00* | (2006.01) |

(52) U.S. Cl.
CPC ............ *B60R 9/06* (2013.01); *B60R 9/08* (2013.01); *B60R 11/02* (2013.01); *B60R 2011/0052* (2013.01); *B60R 2011/0085* (2013.01)

(58) Field of Classification Search
CPC ....................................................... B60R 9/06
See application file for complete search history.

(56) References Cited

U.S. PATENT DOCUMENTS

| | | | | |
|---|---|---|---|---|
| 2,247,128 A | * | 6/1941 | Levey ................... | B60P 3/1025 414/532 |
| 5,884,824 A | * | 3/1999 | Spring, Jr. .............. | B60R 9/042 224/325 |
| 6,769,858 B1 | * | 8/2004 | Butler ...................... | B60R 9/06 414/500 |
| 7,128,341 B1 | * | 10/2006 | Dahl ........................ | B60R 9/06 180/908 |
| 7,226,266 B2 | * | 6/2007 | Henderson .............. | B60R 9/042 414/466 |
| 7,845,528 B2 | * | 12/2010 | McMillan ............... | B60R 9/055 224/310 |
| 8,439,240 B1 | * | 5/2013 | Steiner ................... | G16H 80/00 224/274 |
| 10,384,617 B1 | * | 8/2019 | Keyser ...................... | B60R 9/06 |
| 10,870,453 B2 | * | 12/2020 | Elder ....................... | B60R 9/052 |
| 2002/0148867 A1 | * | 10/2002 | Savant ...................... | B60R 9/06 224/558 |
| 2003/0173387 A1 | * | 9/2003 | Mitchell ................... | B60R 9/06 224/499 |
| 2005/0205628 A1 | * | 9/2005 | Lehmann .................. | B60R 9/06 224/401 |
| 2006/0104767 A1 | * | 5/2006 | Dugger ..................... | B60R 9/06 414/462 |
| 2007/0175937 A1 | * | 8/2007 | Caldwell .................. | B60R 9/06 224/504 |

(Continued)

*Primary Examiner* — Brian D Nash

(57) ABSTRACT

Embodiments disclosed of a multifunctional utility rack attachment device, the components comprise of a body structure, a positioning mechanism, a position securing system, and a modular attachment system. The device mounts either directly or indirectly on to an off-road vehicle's utility rack. The body structure facilitates the use of a modular attachment system geared towards connecting various utility attachments seamlessly. The positioning mechanism facilitates the movement of the body structure some distance from the off-road vehicle creating opportunity for additional utilitarian purposes. The position securing system is used to lock the body structure into place in a specified configuration, as to not allow the positioning mechanism to act upon the body structure. The components are combined together to form the device.

9 Claims, 6 Drawing Sheets

(56) References Cited

U.S. PATENT DOCUMENTS

| | | | |
|---|---|---|---|
| 2011/0133438 A1* | 6/2011 | Haines | B60R 9/048 |
| | | | 280/769 |
| 2012/0091178 A1* | 4/2012 | Hancock | B62K 21/12 |
| | | | 224/571 |
| 2013/0133964 A1* | 5/2013 | Massicotte | B60P 7/0807 |
| | | | 224/547 |
| 2017/0101061 A1* | 4/2017 | Morris | B60R 9/06 |
| 2018/0056740 A1* | 3/2018 | Robarge | B62D 63/067 |
| 2022/0355881 A1* | 11/2022 | Sidwell | B62J 35/00 |
| 2022/0402738 A1* | 12/2022 | Curtis, III | B66F 9/18 |

* cited by examiner

MULTIFUNCTIONAL UTILITY RACK ATTACHMENT

FIELD OF THE INVENTION

The present invention relates generally to off-road motor vehicle utility rack attachments, more specifically it relates to off-road motor vehicle utility rack attachments adapted to be repositioned in order to increase available functionality, that also allows for various interchangeable attachments to be seamlessly fitted for use with the device.

BACKGROUND OF THE INVENTION

Typical utilizations of off-road vehicles such as all-terrain vehicles (ATVs), utility task vehicle (UTVs), or snowmobiles are to allow riders with the opportunity to reach remote locations, whether for recreational or professional purposes. Utility racks fitted to these vehicles have been created in order to allow riders to bring more gear along with them. However, the utility racks placed upon the majority off-road vehicles do not immediately allow for the quick and easy attachment of various tools, they're mostly utilized as a storage area to strap things down upon such as a tents and backpacks. Therefore, various utility rack attachments have been created to store items which are not easily attached, for example cargo boxes, allowing loose items to not come detached during travel. In my experiences of riding to remote locations with off-road vehicles, I find myself utilizing the cargo box for not just internal storage during travel, but also external storage when the vehicle is stationary for a stable and relatively flat place to sit an item. Various problems arise with these cargo boxes when you find yourself out in remote locations, such as needing to open it when you have items places upon it, ensuring items such as a drink won't be easily knocked off, and that the top of the typical cargo box sits at a height not ideal for utilitarian purposes on top of. When examining other forms of off-road vehicle utility rack attachments, you mostly find baskets, rack extensions, rear seats, gun mounts, and tool holder clamps. All of these, even when combined, still do not offer the versatility to meet my needs.

Alaska's Kenai Peninsula is known around the world for its various outdoor sporting activities, specifically hunting and fishing. Tourists come from all over to get a chance to catch a large halibut in the Cook Inlet or salmon in the pristine rivers. On the east side of the Cook Inlet alone, there's over 120 miles of beach, accessible from the road system only in a handful of locations. During summer months, locals and travelers alike fill up their off-road vehicles and take them to the beaches. At times, traveling miles down the rocky beach to find their favorite remote location for surf fishing. Having arrived at their beach surf fishing location, they typically remove a rod holder from a cargo box affixed to the utility rack. Rod holders for surf fishing typically come affixed to a metal stake also known as a sand spike, which is to be placed into the ground. It is not uncommon while surf fishing, for it to take hours to get a bite after casting, thus the rod holder grants free hands during that time. However, due to the rocky conditions of the beach, the metal stakes/sand spikes affixed to the rod holders are often unable to penetrate the ground far enough to adequately hold a surf fishing rod. Many a times leaving surf fishermen angry and wishing they had brought yet another tool such as a hammer to force the stake in further. However, most commercial surf rod holders of today aren't built in a way which allows the user to hammer it into the ground without breaking the plastic rod holder attached, leaving the surf fishermen holding their poles for the rest of the day. An attachment to the off-road vehicle's utility rack, allowing an anchor point to affix a rod holder clear of the vehicle itself, would be ideal for this situation, allowing the surf fishermen to leave their stake and hammer at home. Now, once a fisherman lands a fish and successfully reels it in, they find yet another need—a place to fillet the fish. In order to get the best quality from the fish such as texture/flavor and to prevent the growth of bacteria from the gut, it's best to fillet it immediately. At this point in the process, I've seen fishermen using the top of their expensive drink coolers, the seat of their off-road vehicle, driftwood, and even rocks as a surface to fillet or gut the fish. Even if the fisherman's off-road vehicle utility rack had a flat board placed upon it to fillet the fish, they'd be doing so directly over top of the vehicle which is not ideal.

In the previous scenario alone, we've uncovered two problems that could be handled by a single new device which utilizes the off-road vehicle's utility rack. Along with that, the way utility racks are connected to vehicles can vary greatly depending on make and model, such as the attachment points and type of brackets used. Thus, making it difficult to easily find a new utility rack compatible with the attachment points provided by a specific vehicle, let alone one which provides the necessary versatility. Even if there were a utility rack that met the needs of the individual, there's a lot of work which goes into removing an old rack and fastening a new one. Therefore, an attachment versatile enough to affix to varying utility racks while being capable of acting as an interface for a plurality of attachments is needed.

Looking at previous implementations of off-road vehicle utility rack attachments, we're typically left with objects that are either too bulky, single purpose serving, or limit the capabilities and/or flexibility granted from an off-road vehicle. Owners of off-road vehicles who are not fishermen, can still find a flat surface which attaches to the utility rack useful, especially one which creates a distance from the vehicle itself. Those which enjoy camping or day trips on their off-road vehicle may find it useful as a table, swiveling away from the vehicle itself to create a space to prepare food or to enjoy lunch or dinner on the flat surface. Moreover, such an attachment allowing for easy add-ons, is needed to enhance the capabilities to hold items such as a beverage more securely.

At the end of the day, the owner of an off-road vehicle shouldn't have to choose between having such an attachment affixed to their utility rack and carrying additional items. Thus, the need for a lightweight utilitarian attachment capable of allowing additional storage upon is necessary.

SUMMARY OF THE INVENTION

The following subject matter disclosed and claimed herein, presents a simplified summary with the intent of offering a basic overview to provide a foundational understanding for some of the aspects of the disclosed novel, useful, and non-obvious innovation. This simplified summary is not an extensive overview and therefore is not intended to identify all key and/or critical elements or to define the full scope of the innovation. The intention is to offer a simplified overview of general concepts as a preface to the more comprehensive detailed description that follows which form the subject matter of the claims appended hereto. For the sake of clarity, the subject matter disclosed and claimed herein does not represent all embodiments of the multifunctional utility rack attachment designed for use on off-road vehicles.

The multifunctional utility rack attachment is a machine that introduces new functionality, improves upon existing functionalities, and advances the adaptability of existing ideas for utility rack attachments. The multifunctional utility rack attachment generally consists of the following core components: a body structure, a positioning mechanism, a position securing system, and a modular attachment system. Engineered for versatility, different embodiments of the device can be formulated to facilitate secure affixation to the utility rack through either direct or indirect connections, thus broadening its compatibility and functional reach.

A possible embodiment facilitating a direct connection may leverage various aforementioned components working synergistically to securely affix the device to the utility rack, forming a cohesive unit collectively referred to as the mounting module. An alternative direct connection embodiment introduces an additional distinctive component, designated as the mounting module, functionally securing the device to the utility rack.

Conversely, embodiments constructed for an indirect connection are integrated with features that functionally heighten the adaptability for the device's affixation with commercially available components or systems. In these embodiments, an engagement apparatus is introduced, characterized as a specialized component serving as a bridge between one or more of the core components and existing systems of affixation. Thereby extending the device's compatibility across diverse set-ups.

Prior to discussing additional functionalities granted from the multifunctional utility rack attachment, a brief overview of core components is necessary. The robust body structure acts as an interface to other core components and makes up the main surface area. The positioning mechanism works to allow repositioning of at least some portion of the body structure away or towards the utility rack. The position securing system functions to restrict the positioning mechanism, securing the body structure from unintended repositioning. The modular attachment system integrates with the body structure, inhibiting seamless interchangeability of mounts, fitments, or attachments.

Uniting these core components and attaching them to an off-road vehicle's utility rack creates an unforeseen innovation. The usefulness of this novel machine surpasses prior art, providing a multitude of functionalities for varying circumstances. There are numerous problems solved by the innovation at hand, some of those aspects will be discussed now.

ATV users when going surf fishing on the beach, for example, must not choose between bringing the multifunctional utility rack attachment and a cooler attached to the front utility rack. Had the front rack contained other various attachments found in previous art, most would have to be removed in order to bring the cooler. For example, due to the height of cargo boxes, if one attempted to stack a cooler upon it and strap it down, the heightened center of gravity would produce excessive leverage and in turn be unsafe to travel with. The slimmer and sturdy nature of the multifunctional utility rack attachment's mostly flat body structure surface does not cause an excessive center of gravity change producing undue leverage when stacking a cooler on it while in a travel configuration.

Additionally, an embodiment of the positioning mechanism can allow the body structure to swivel from sitting perpendicular to the ATV to parallel, with a portion of the body structure positioned forward of the ATV. With the position securing mechanism engaged, the body structure will become stable. The modular attachment system allows for a connection of a fishing rod holder accessory, fitting through the body structure, allowing the necessary support for a fishing rod. Thus, there's no need for the ATV user to bring along a stake/sand spike and a hammer to adequately position a rod holder within the sand. Even with the fishing rod mounted to the multifunctional utility rack attachment, there's additional surface area on the body structure which can be utilized for many purposes. Such purposes include but are not limited to sitting the tacklebox on, a cutting board for bait or fileting a potential catch, setting a camera on to record the action, etc. Situating the rod holder on the multifunctional utility rack attachment is also ideal because it raises the height of the fishing rod tip versus if it were on the ground, ultimately increasing the allowable range from the height of the wave breaking action and the line—helping keep the bait and hook from coming ashore.

With this embodiment of the multifunctional utility rack attachment's positioning mechanism creating a clearance away from the ATV, wherein nothing is between the ground and the body structure, it also creates utilitarian solutions beyond fishing purposes. The body structure will sit at an ideal height for a range of utilitarian purposes. It can act as a table for two, allowing chairs to be pulled up to either side, with the body structure's surface holding food plates. Not just that, but it creates leg space and a surface to place a laptop on when work needs to be done away from the office. Various embodiments can implement different positioning mechanisms, permitting diverse position capabilities, not just limited to swiveling.

One embodiment of the modular attachment system allows for more than one accessory to be attached. Rather than just having one accessory affixed or mounted, multiple accessories could be applied to the modular attachment system. For instance, the body structure could have one or more voids for accessory inserts or even a grid of embedded attach points. These locations are capable of seamlessly fitting accessories such as beverage holders, tie down points, a phone holder, etc. The utilitarian purpose is seemingly endless. The innovation allows for users to decide what their needs are rather than a one size fits all approach, the modular attachment system is agile; creating the opportunity for fast interchangeability meeting the changing needs of the user.

DETAILED DESCRIPTION OF THE INVENTION

One embodiment of the multifunctional utility rack attachment is illustrated in FIGS. 1, 2, 3, 4, 5, and 6. Another embodiment of the device, particularly detailing another type of modular attachment system, can be seen in FIGS. 7 and 8. In all figures, a body structure 1 is shown, which can be described as a cuboid type shape or board made out of wood and containing a relatively flat and level surface. However, the body structure 1 can be made with other types of materials that are not easily bent and are capable of providing a sturdy surface, such as hard plastics, metals, composites, carbon fibers, polymers, etc. The shape of the body structure 1 may differ between embodiments, but a requirement is that it consists of a three-dimensional structure containing at least one significantly flat and level portion facilitating the placement of objects thereon. The body structure 1 shall be no longer than the width of the off-road vehicle in which the device is placed upon, this facilitates a safer experience for operators of the device.

Figure 3:
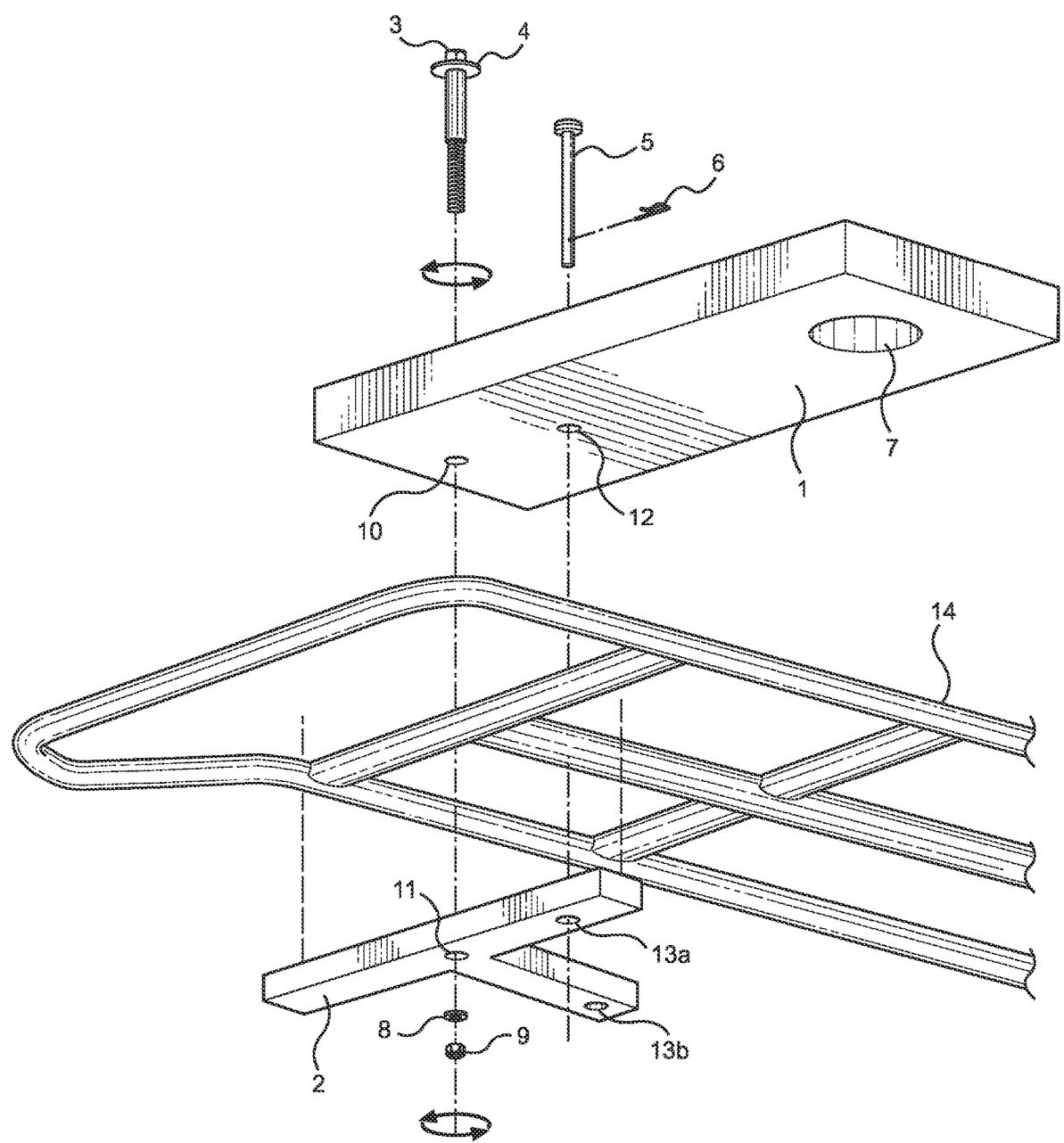
FIG. 3 shows how the same embodiment in FIG. 1 is affixed to the utility rack, with an exploded view of the parts making up this embodiment.

An embodiment of the body structure 1 illustrated in all figures, contains two holes drilled through it, which can be seen well in FIG. 3 labeled as 10 and 12. The hole 10 in FIG. 3 is positioned aft of the center of the body structure 1 and offset a couple inches from its end, centered in terms of width. The length in which hole 10 is offset from the end of the body structure 1 will vary between embodiments depending on the length of the body structure 1, forces applied to the ends and sides of the body structure 1, and the materials used in order to ensure its structural integrity during normal use. The hole 12 in FIG. 3 is offset forward of hole 10 by a few inches. For this embodiment, the exact length in which hole 12 is offset forward of hole 10 can vary depending on the space between the utility rack's bars in which the device is placed upon. This ensures both a clear passage so that there is no utility rack bar blocking the hole while the device is placed into necessary configurations and so that the integrity of the body structure 1 in that area is not compromised by normal forces placed upon it.

Figure 1:
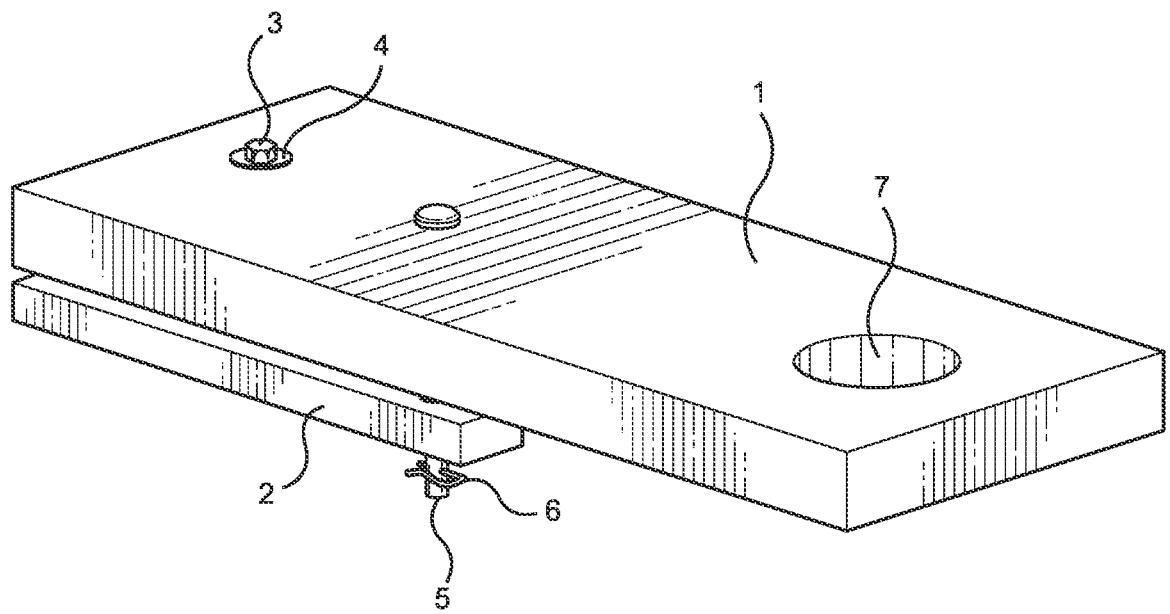
FIG. 1 is a view slightly above and off to side from the front of the device, the body structure in plain view, containing a large hole used as a modular attachment system.
Figure 2:
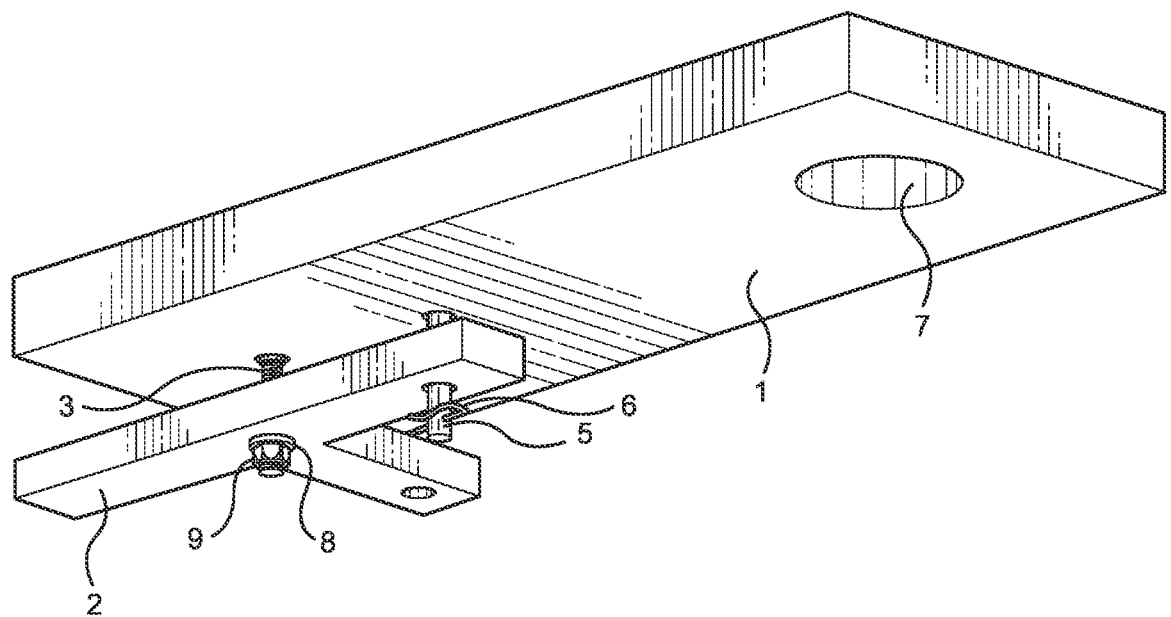
FIG. 2 shows the underside of the same embodiment in FIG. 1, further detailing the view of this embodiment's positioning mechanism and position securing system.

Illustrated in FIG. 1, a shoulder bolt 3 is placed through a washer 4, which passes through the body structure 1 via the aforementioned hole 10 in the body structure 1 illustrated in FIG. 3. This shoulder bolt 3 acts as a pivot point for the body structure 1 to swivel around. In this embodiment, the hole 10 from FIG. 3, the shoulder bolt 3 from FIG. 1, and the washer 4 from FIG. 1 come together to make up this multifunctional utility rack attachment embodiment's component, named the positioning mechanism, which is used for repositioning the device's body structure. However, other embodiments may utilize different designs including but not limited to rails, swivel plates, hydraulic lifts, or extension arms; with accompanying components to attach those to the body structure. So long as it facilitates a swiveling, sliding, lifting, or extending of the body structure a variable distance from the utility rack or the off-road vehicle to which the utility rack is attached, it will act as a positioning mechanism.

Additionally illustrated in FIG. 1 is a clevis pin 5, which passes through the body structure 1 via the aforementioned hole 12 in body structure 1 illustrated in FIG. 3. The clevis pin's 5 purpose is to restrict the degree of freedom provided by the single pivot point created with the shoulder bolt 3, essentially securing the body structure 1 from swiveling by adding in this second fixed point. When the clevis pin 5 is removed, the body structure 1 regains the ability to rotate around the single point. The system which is used to secure the body structure from unintentional repositioning or the positioning mechanism from acting upon the body structure from its specified configuration unintentionally is referred to henceforth as the position securing system.

In this embodiment, in order for the position securing system to be effective, the clevis pin 5 itself needs to be restricted as a fixed point. The same idea applies to the aforementioned positioning mechanism so that the shoulder bolt 3 becomes a fixed point for the body structure 1 to swivel around. To begin to address these concerns for this embodiment, a metal T-shaped plate 2 in FIG. 1 is introduced. As can be seen in FIG. 1, the clevis pin 5 is going through the metal T-shaped plate 2. Focusing attention to FIG. 2, we can see an underside view of the body structure 1, the metal T-shaped plate 2 underneath it. Turning attention towards FIG. 3, this is a view from under the metal T-shaped plate 2, showing it underneath the off-road vehicle's utility rack 14, with the body structure 1 above the utility rack 14. We can see the shape of this metal T-shaped plate 2 was additionally designed for affixing the multifunctional utility rack attachment to the off-road vehicle's utility rack 14 in FIG. 3. However, in other embodiments, the multifunctional utility rack attachment may be affixed by other methods directly or indirectly to the off-road vehicle's utility rack 14. The metal T-shaped plate 2 has a hole 11 seen in FIG. 3 drilled through it toward the center of it's span between two bars of the utility rack 14, this hole fits the threaded end of the shoulder bolt 3. The body structure 1 lays on top of the utility rack 14, and the metal T-shaped plate 2 is placed underneath and towards the left side of the utility rack 14 between two of the utility rack's bars as so it cannot be lifted through the utility rack 14. The shoulder bolt 3 goes through washer 4 then the threaded end through hole 10 within the body structure 1 and then through hole 11 in the metal T-shaped plate 2 as the metal T-shaped plate 2 is held up to the underside of the utility rack 14. A locking washer 8 is placed on the threaded end of the shoulder bolt 3 where it passes through the bottom of the metal T-shaped plate 2, then a locking nut 9 is placed on afterwards. Upon tightening the locking nut 9 to the shoulder bolt 3, the metal T-shaped plate 2 will become tight to the underside of the utility rack's bars, securing the body structure 1 down to the utility rack 14. The locking nut 9 should be tightened enough so that the metal T-shaped plate 2 will not easily shift during normal use of the off-road vehicle or the multifunctional utility rack attachment, while still allowing the body structure 1 to swivel around the shoulder bolt 3. The washer 4 allows for a reduction of friction between the shoulder bolt's 3 head and the body structure 1, so even though the shoulder bolt 3 has been tighten down to the rack well, there should be enough give provided by the washer 4 to allow the body structure 1 to swivel around the shoulder portion of the shoulder bolt 3. Additional methods of securing the metal T-shaped plate 2 can be taken if desired, such as pipe straps or heavy-duty steel band clamps going around the metal T-shaped plate 2 and around the utility rack's 14 bars then tightening them together. Another embodiment could add a pole mount to the top end of the metal T-shaped plate 2 to secure directly to the utility rack's 14 bars.

Figure 4:
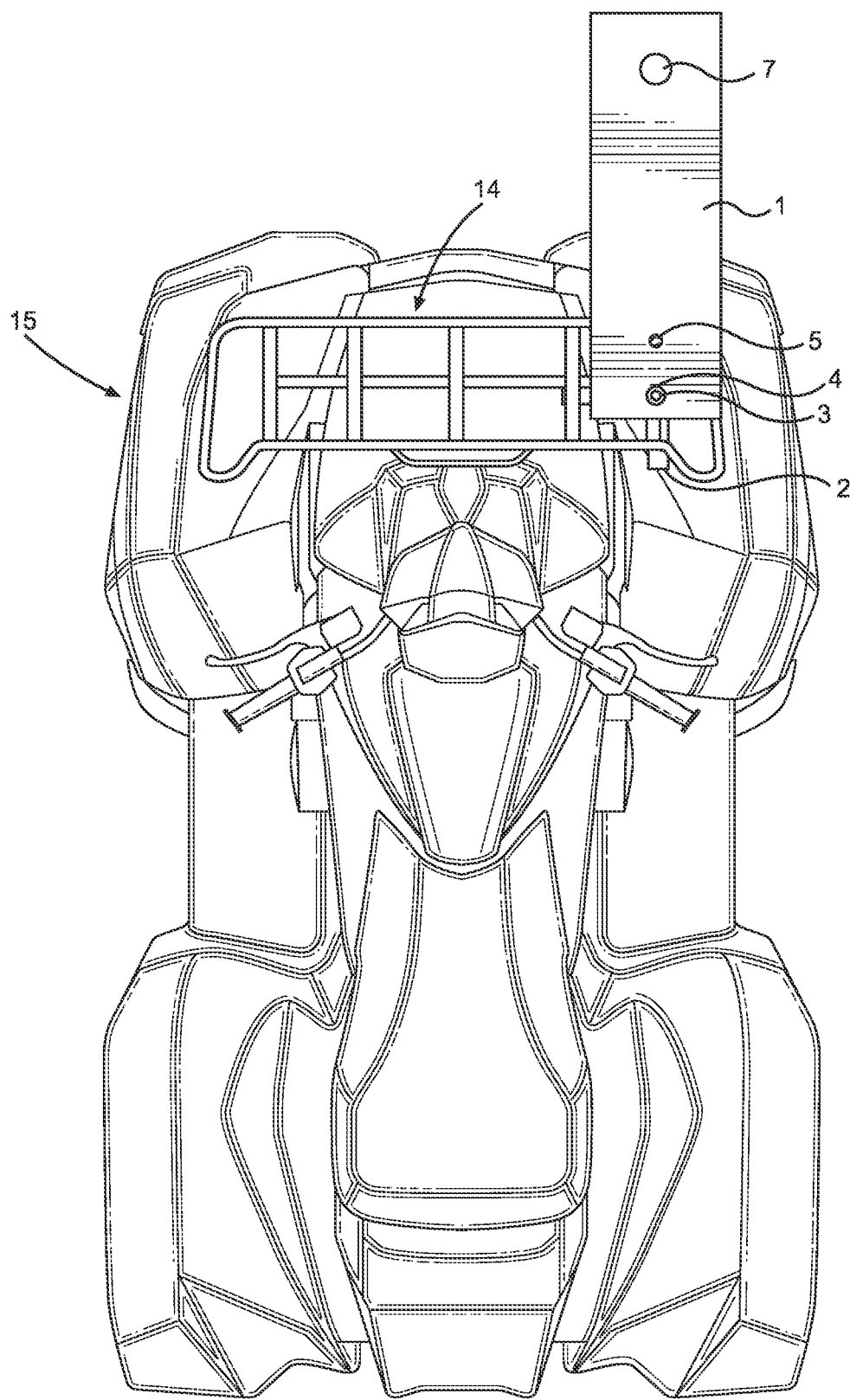
FIG. 4 shows the same embodiment in FIG. 1 connected to an ATV's utility rack and with the device positioned in a stationary configuration, where it's used for utilitarian purposes.
Figure 5:
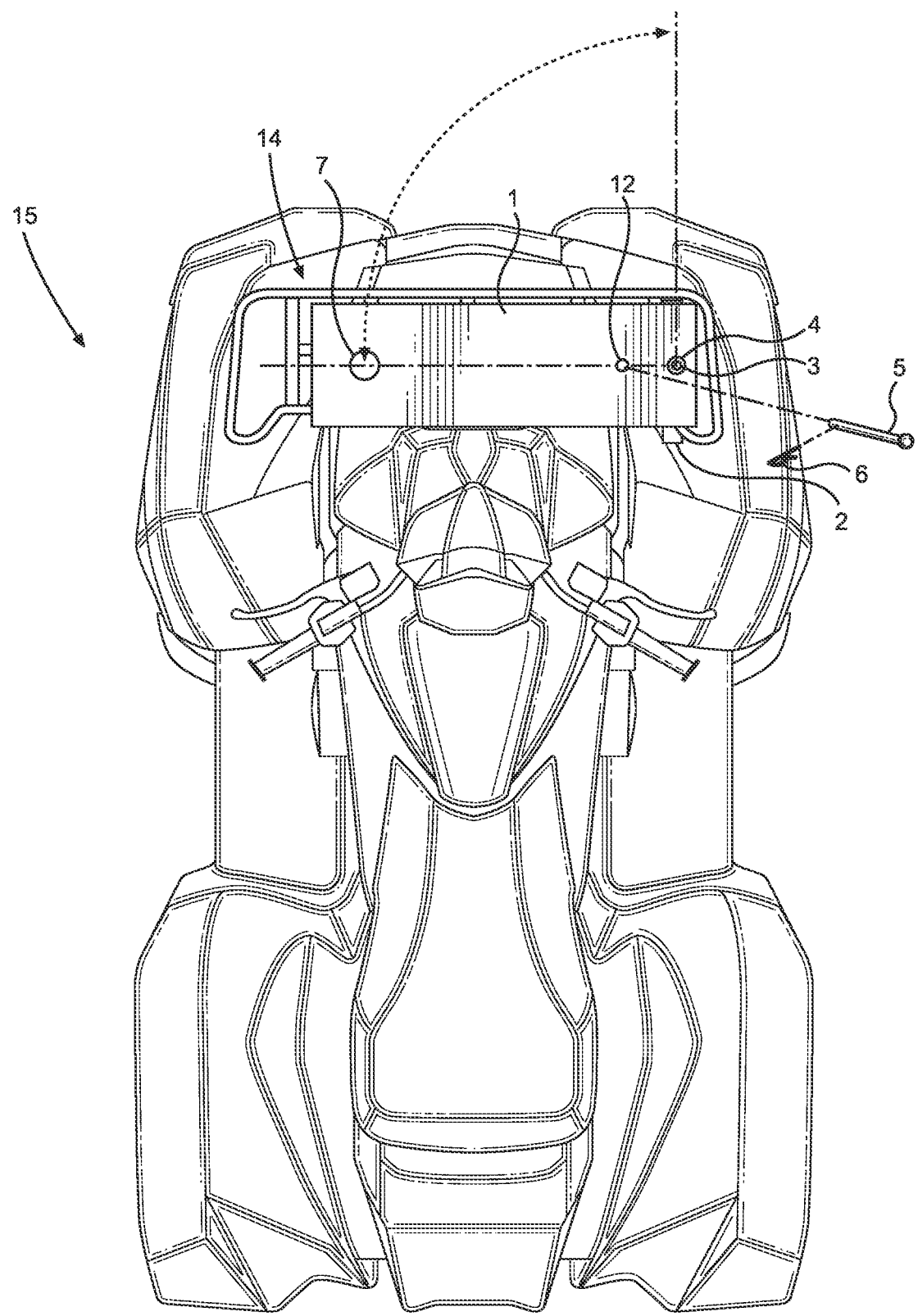
FIG. 5 shows the same embodiment in FIG. 1 connected to an ATV's utility rack and with the device positioned in a traveling configuration, with a graphic showing how the device swivels to/from the stationary configuration from FIG. 4.

The metal T-shaped plate 2 has two holes, 13a and 13b, illustrated in FIG. 3. These holes are of equal distance from the hole 11 but positioned into two separate areas and are also the same distance as that span from holes 10 and 12 in the body structure. These two holes, 13a and 13b, detail the possible configuration positions for this embodiment of the multifunctional utility rack attachment. As the front of the body structure 1 is lifted and swiveled around the pivot point (shoulder bolt 3), the hole 12 in the body structure will align with holes 13a or 13b. When the hole 12 is positioned over 13a, this would be the stationary configuration position, so the clevis pin 5 can then be placed down through hole 12 in the body structure 1, and through hole 13a. The cotter pin 6 can be added to the hole in the clevis pin 5, as to not allow the clevis 5 pin to pop-out of position. The configuration in which is seen in FIG. 4 would be the stationary configuration for this embodiment, with the front of body structure 1 forward of the off-road vehicle 15, allowing for increased utility of the device. In FIG. 5, we can see the clevis pin 5 removed from the hole 12 in the body structure 1. With the body structure 1 having swiveled from the stationary position over metal T-shaped plate's hole 13a illustrated in FIG. 3 to the travel position over the metal T-shaped plate's hole 13b illustrated in FIG. 3. With the body structure 1 in the position pictured in FIG. 5, the clevis pin 5 can be added back into hole 12 within the body structure 1, through the metal T-shaped plate's hole 13b from FIG. 3 and the cotter pin 6 can be placed into the hole within the clevis pin 5 to keep the clevis pin 5 securely positioned while the off-road vehicle 15 is moving, keeping the body structure 1 from moving unintentionally. Thus, having fully described the successful positioning mechanism, position securing mechanism, and a method of securing the device to the off-road vehicle's utility rack for this embodiment illustrated.

Figure 6:
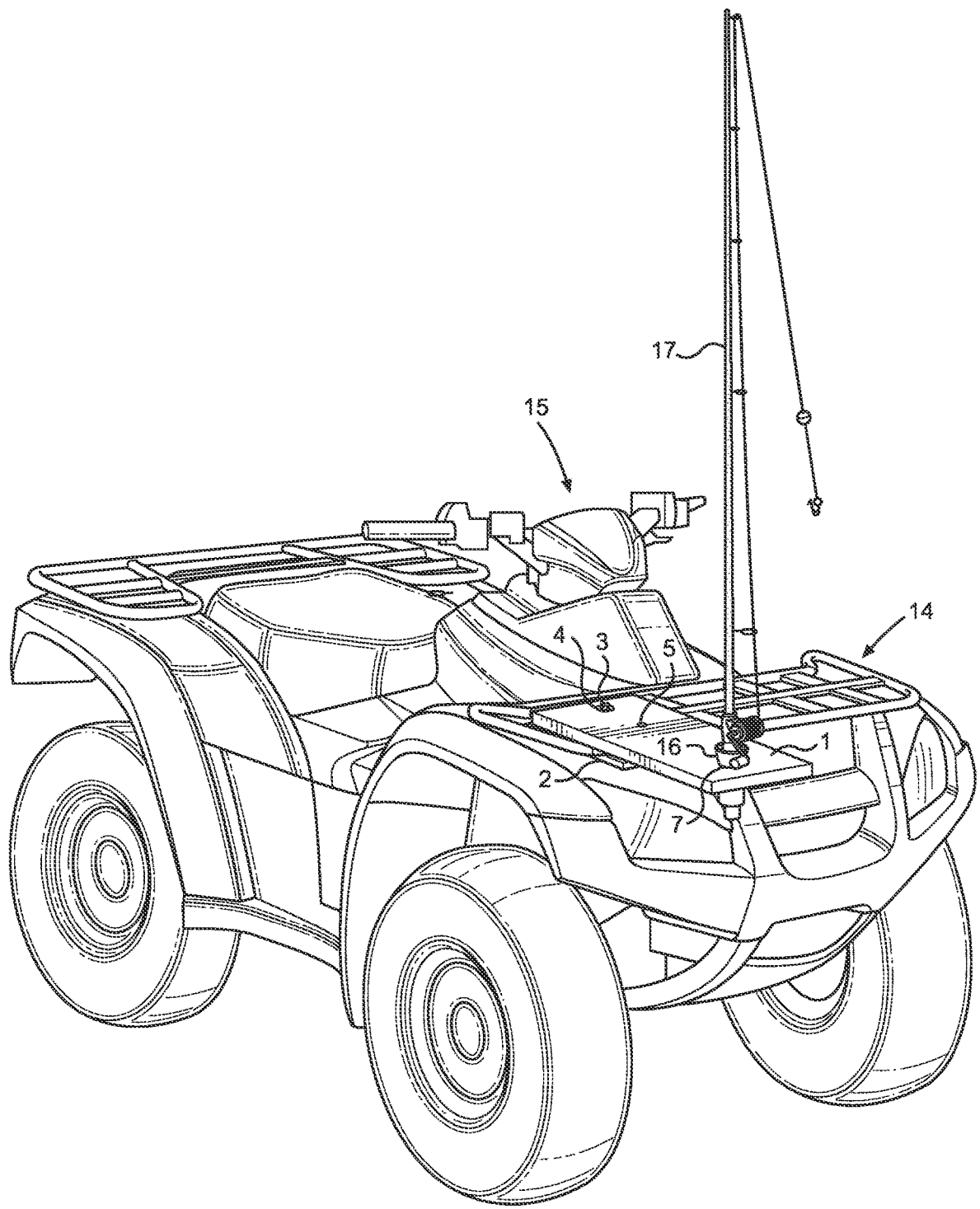
FIG. 6 shows the same embodiment in FIG. 1 connected to an ATV's utility rack and with the device positioned in a stationary configuration, where the device is being utilized to mount a fishing rod holder containing a fishing rod.

Continuing on with the body structure 1 illustrated in FIGS. 1, 2, 3, 4, 5, and 6, a larger hole 7 is located towards the opposite end of the swivel point or shoulder bolt 3 on the body structure 1. The hole 7 is a modular attachment system utilized with this embodiment. This embodiment of the modular attachment system is capable of containing a variety of inserts when the device is configured within the stationary configuration. Illustrated in FIG. 6 is the modular attachment system hole 7 containing a fishing rod holder 16 which holds a fishing rod 17. Various other attachments or items can be utilized with the modular attachment system pictured here including but certainly not limited to a beverage holder, an umbrella, or camera mount. The additional surface area of the body structure 1 is ideal in this embodiment for a wide variety of purposes, which will be discussed later on.

Figure 7:
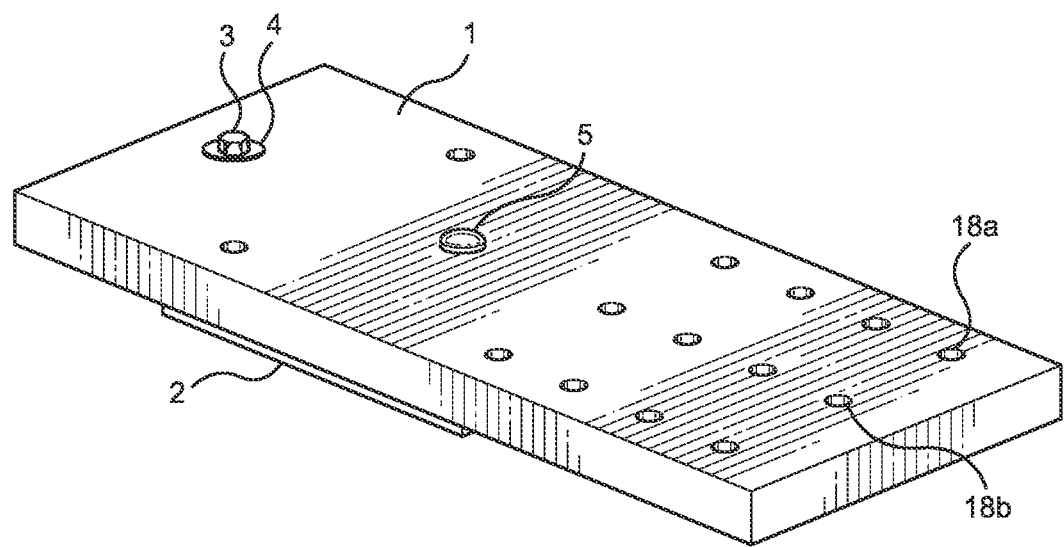
FIG. 7 shows a different embodiment of the device's modular attachment system than in FIG. 1, where plural threaded inserts are embedded in the body structure.
Figure 8:
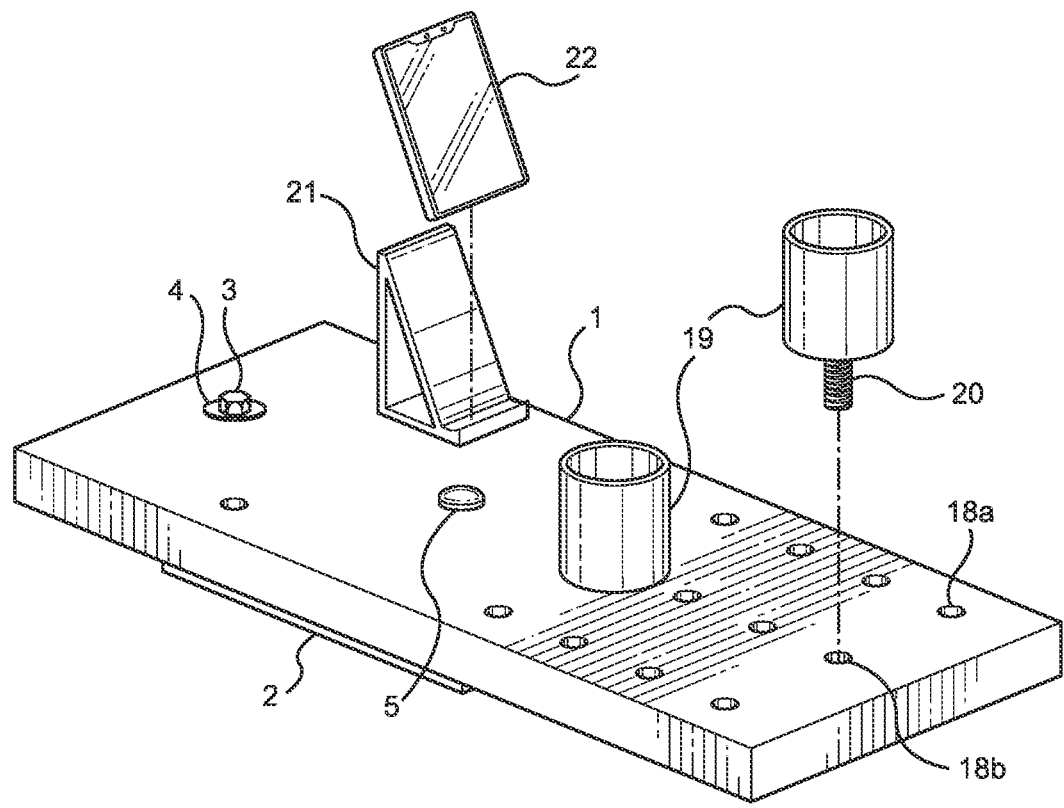
FIG. 8 shows the same embodiment in FIG. 7 but with an example of how the embodiment's modular attachment system can be utilized with easily affixed attachments.

FIGS. 7 and 8 illustrate another embodiment of the body structure 1 implementing a different modular attachment system capable of having a plurality of attachments affixed simultaneously. The many holes in the body structure 1, two of which are labeled 18a and 18b in FIG. 7 and FIG. 8, contain threaded inserts. The inserts provide a way of easily affixing attachments to the body structure 1, by just requiring a correctly sized bolt mounted to the attachment to be screwed into any of the available insert locations (such as 18a or 18b) in the body structure 1. As illustrated in FIG. 8, the bolt 20 is affixed to the bottom of the beverage or cup holder 19 and is then screwed into an available insert location. Another example is the cell phone holder 21 which is affixed using the same method, in which a cell phone 22 can then be placed upon. A wide variety of existing items, item holders, or attachments can be easily modified to be affixed using this modular attachment system illustrated.

Having successfully described at least one fully functional embodiment of the multifunctional utility rack attachment device as a whole containing the main components such as a body structure, a positioning mechanism, a position securing system, and a modular attachment system; we can expand on various embodiments and restrictions of each in addition to utilitarian purposes.

Potential embodiments of the device do not have to contain a metal T-shaped plate 2 as illustrated in all figures. The metal T-shaped plate 2 illustrated is just one way to connect the various necessary main components mechanically while affixing the device to the utility rack 14. Various methods of affixing the multifunctional utility rack attach directly or indirectly to the utility rack may be used. Affixing the device directly to the rack may suit specific utility racks better, such as those with predrilled holes in specified locations, allowing for quicker device attachment or a precise fit to the utility racks.

Potential embodiments of the multifunctional utility rack attachment device can be of any color. Embodiments may contain an integrated electrical system, used for charging of electronic devices, powering attachments affixed to the modular attachment system, or acting as an automated way for the positioning mechanism to reposition the body structure to different configurations. Additionally, an embodiment's modular attachment system could be one or more: hole(s) through the body structure, insert(s) within the body structure (such as a threaded insert), hollow cavities within the body structure 1, or protruding mechanism(s), each facilitating the receipt, mounting, or fixation of interchangeable attachments. Embodiments of the position securing device may vary widely depending on the positioning mechanism utilized or the shape of the body structure.

The utility of the multifunctional utility rack attachment device can vary depending on the design of the modular attachment system and size or shape of the body structure. The embodiment of the device illustrated in FIG. 6 is geared more towards a person focused on surf-fishing, while the embodiment of the device illustrated in FIG. 8 is designed for typical off-road vehicle users in mind. The device itself, allows for the easy affixation of attachments to the device and an area to utilize items with the device but with a distance from the off-road vehicle. In terms the embodiment in FIG. 6, the device allows for the rod holder 16 to not have to be placed within the ground via a sand stake, allowing the operator to leave items such as the sand stake and hammer at home. The device keeps the fishing rod 17 tip higher above the wave breaking action than if it were on the ground, facilitating successful surf-fishing with higher waves than would otherwise. Additionally, it would take a mighty big fish to pull the off-road vehicle into the ocean versus a sand stake. The surface of the body structure 1 is at an ideal height and creates enough room to allow the operator to fillet fish upon or lay a tackle box on. There are many cases such as this for the use of the device, it's designed to be multifunctional and fit the utilitarian uses of the varying needs of off-road vehicle operators. The embodiment in FIG. 8, allows for an assortment of attachments to be affixed and used in a variety of way either while it's in the aforementioned traveling or stationary configurations. For example, when in the stationary configuration the body structure 1 can be used as a table surface for two people to eat at, allotting for room underneath for pulling chairs up to, while having enough room on the body structure 1 for a phone holder attachment or beverage holders to be placed into the aforementioned modular attachment system so they can watch a video or take a picture as a memento of the experience. The traveling configuration for this device, the position of this configuration is illustrated with one possible embodiment in FIG. 5, is ideal for stacking things on top of and still be able to strap them down to the off-road vehicle's utility rack 14 as one would otherwise. For example, a foldable chair or a cooler could be placed upon top of the body structure 1, and it would be an adequate and sturdy surface for those items while still allowing them to be strapped down using the utility rack 14 beneath.

The invention claimed is:

1. A multifunctional utility rack attachment system for use on off-road wheeled or tracked vehicles including but not limited to ATVs, UTVs, snowmachines, or jeeps, attached directly or indirectly to the vehicle's utility rack, and comprising of:
   a body structure which has a length no longer than the width of the vehicle to which the utility rack is affixed, having at least one significantly flat and level portion facilitating the placement of objects thereon, and includes features facilitating a reasonably stable and secure connection to the utility rack to which it is directly or indirectly attached, ensuring it remains firmly affixed during the normal operation and use of the vehicle in a traveling configuration, to prevent unintended detachment;
   a positioning mechanism integrated into or attached to said body structure, facilitating a variable distance from the utility rack or the off-road vehicle to which the utility rack is attached, enabling configurations suitable for both travel and stationary phases, wherein said positioning mechanism incorporates one or more features for repositioning said body structure selected from the group consisting of: swiveling, sliding, hydraulic lifting, or extending;
   a position securing system to secure said body structure into a selected configuration facilitated by said positioning mechanism;
   a modular attachment system integrated into said body structure, characterized by one or more features selected from the group consisting of: a hole through the body structure, an insert within the body structure, or hollow cavity within the body structure, or a protruding mechanism, each facilitating the receipt, mounting, or fixation of interchangeable attachments.

2. The multifunctional utility rack attachment of claim 1, wherein the body structure includes an integrated electrical system; facilitating the powering or charging of attached devices or attachments or the automated repositioning of the device via the positioning mechanism, said electrical system incorporating power supply mechanisms including but not limited to solar panels, batteries, or connections to the vehicle's electrical system, and capable of providing power to a range of attachments including but not limited to lighting systems, GPS devices, electronic coolers, or charging ports for mobile devices.

3. The multifunctional utility rack attachment of claim 1, wherein in the means of said position securing system secures said body structure into a selected configuration by means including, but not limited to, mechanical locks, friction locks, hydraulic locks, magnetic locks, or locking pins such as cotter, clevis, or quick-release pins.

4. The multifunctional utility rack attachment of claim 1, wherein said body structure further comprises a weather-resistant coating or treatment to protect against environmental elements including but not limited to rain, snow, UV rays, and corrosive materials.

5. The multifunctional utility rack attachment of claim 1, wherein said body structure is equipped with integrated safety features including but not limited to reflective surfaces, LED lighting, or signaling devices to enhance visibility and safety during use.

6. The multifunctional utility rack attachment of claim 1, wherein the modular attachment system can accommodate electronic devices including but not limited to GPS devices, smartphones, tablets, or speakers.

7. The multifunctional utility rack attachment of claim 1, wherein the body structure is foldable or collapsible to facilitate storage and transportation when not in use.

8. The multifunctional utility rack attachment of claim 1, wherein said body structure includes attachment points for securing objects with straps, ropes, or chains.

9. The multifunctional utility rack attachment of claim 1, wherein said body structure incorporates insulative properties to maintain the temperature of stored objects, including but not limited to an insulated compartment or a built-in cooler.

* * * * *